(No Model.) 3 Sheets—Sheet 3.
J. B. MOTTER & E. B. TODD.
CAR COUPLING.
No. 411,466. Patented Sept. 24, 1889.
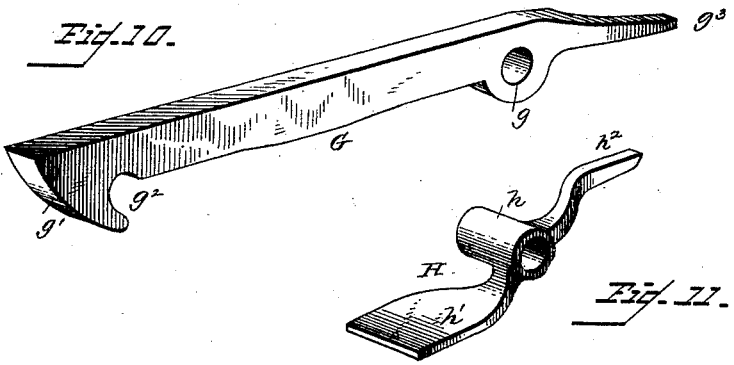
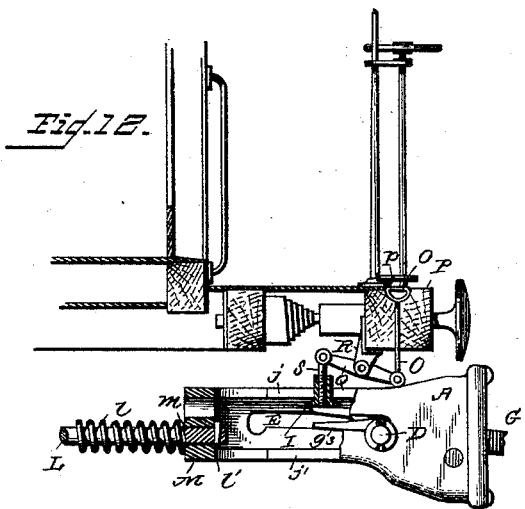
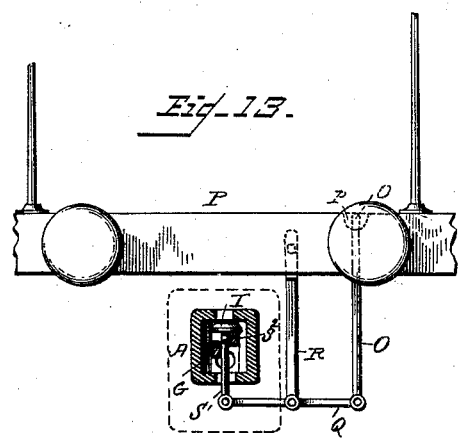
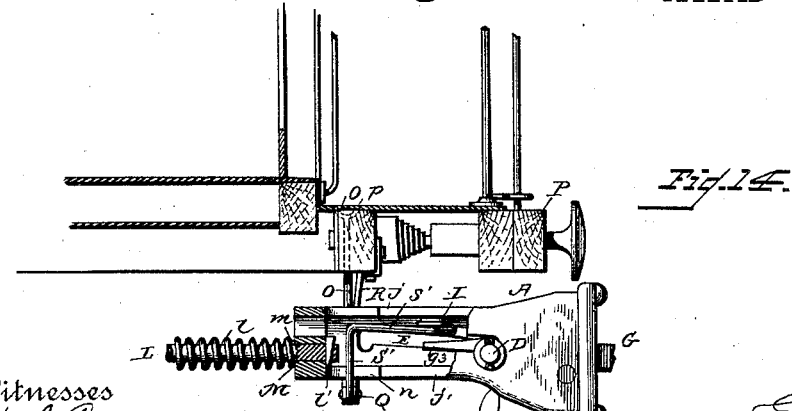
Witnesses
Inventors
Jerome B. Motter and Erastus B. Todd,
By their Attorney

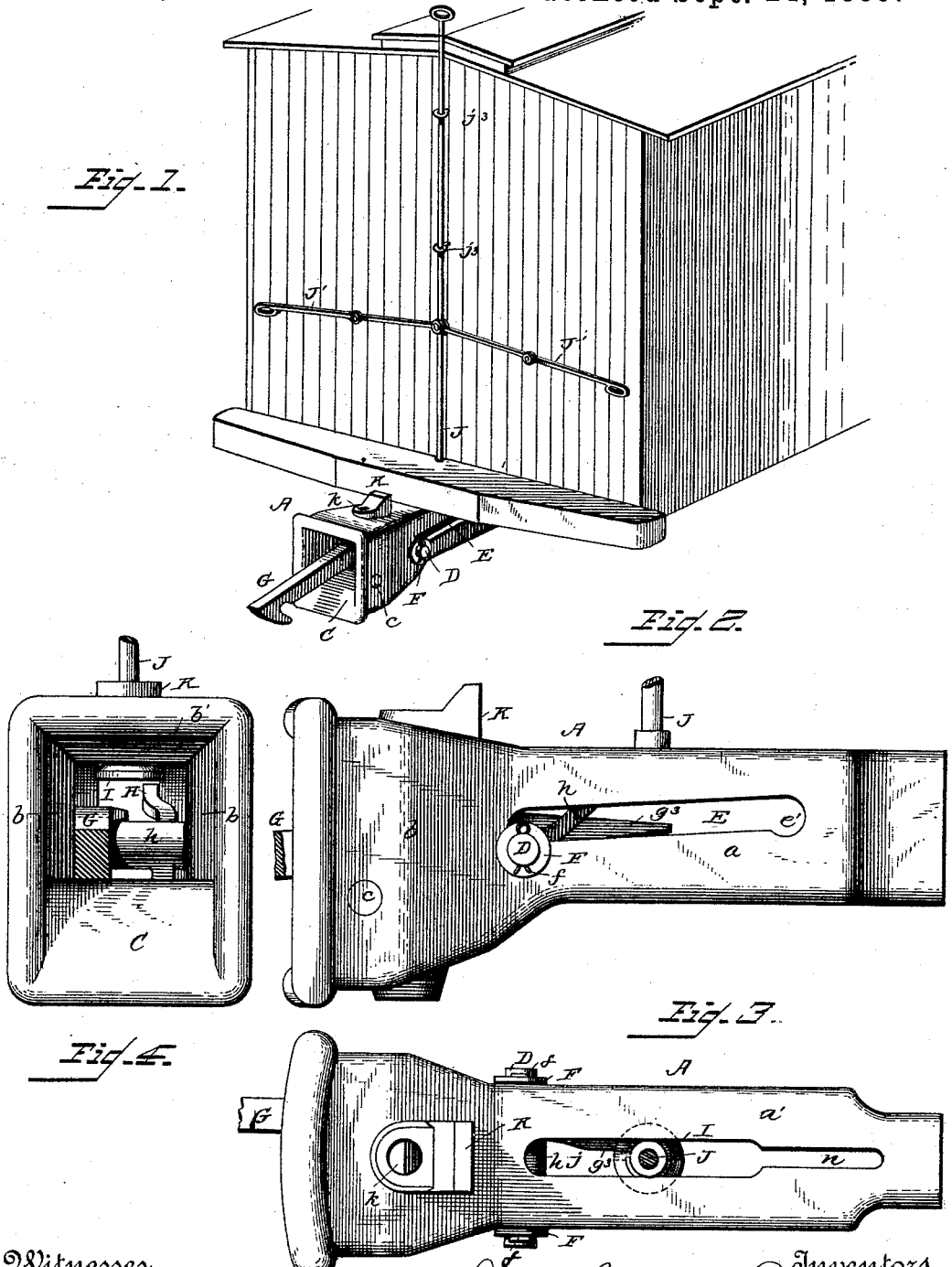

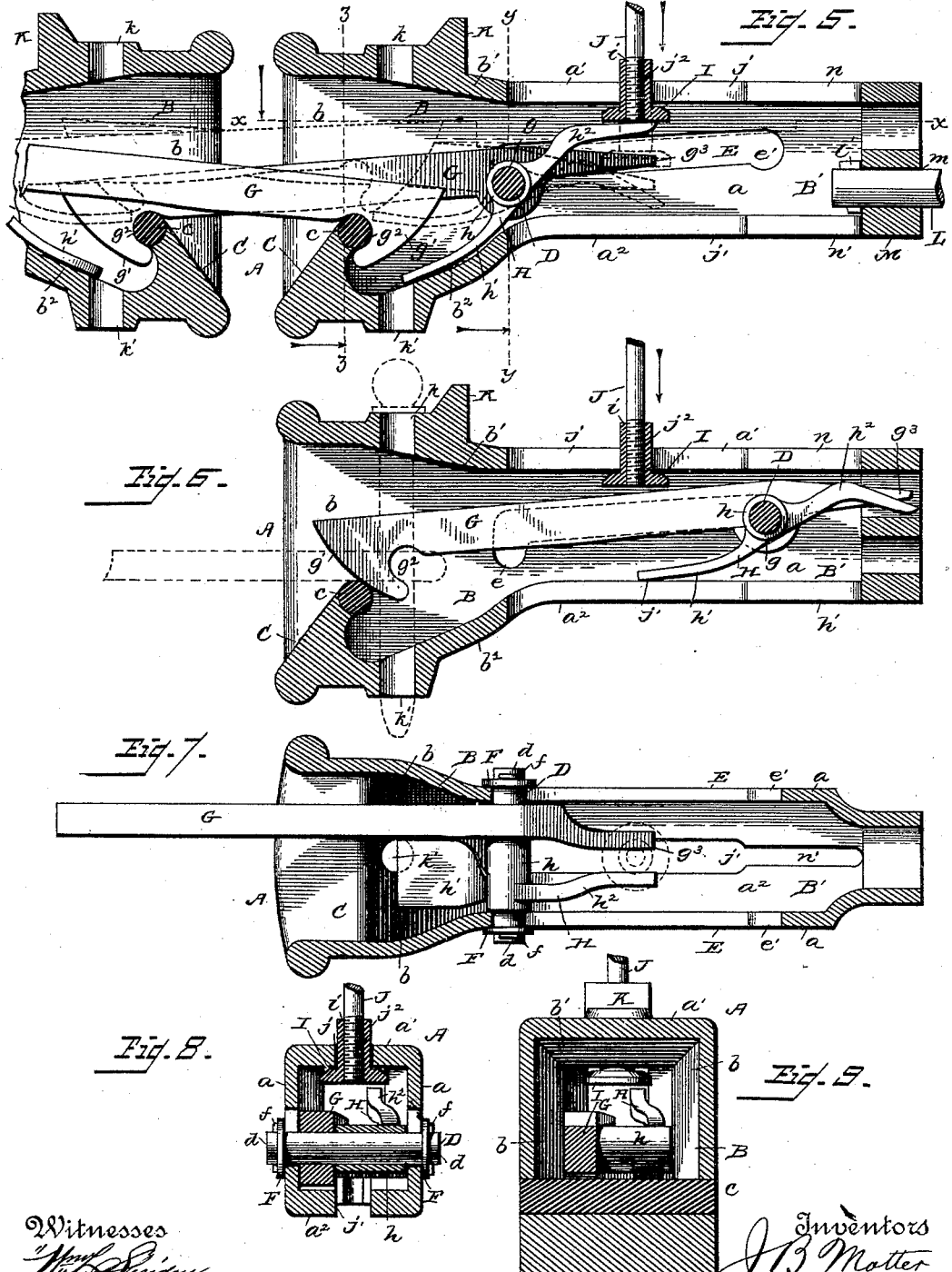

UNITED STATES PATENT OFFICE.

JEROME B. MOTTER, OF MANNINGTON, WEST VIRGINIA, AND ERASTUS B. TODD, OF PITTSBURG, PENNSYLVANIA, ASSIGNORS OF ONE-EIGHTH TO CHARLES L. SCHAUM, OF PITTSBURG, PENNSYLVANIA.

CAR-COUPLING.

SPECIFICATION forming part of Letters Patent No. 411,466, dated September 24, 1889.

Application filed August 22, 1888. Serial No. 283,402. (No model.)

*To all whom it may concern:*

Be it known that we, JEROME B. MOTTER, a citizen of the United States, residing at Mannington, in the county of Marion and State of West Virginia, and ERASTUS B. TODD, a citizen of the United States, residing at Pittsburg, in the county of Allegheny and State of Pennsylvania, have invented certain new and useful Improvements in Car-Couplings; and we do hereby declare that the following is a full, clear, and exact description of the invention, which will enable others skilled in the art to which it appertains to make and use the same.

This invention relates to that class of car-couplings which embody a pivoted coupling-hook mounted in one draw-head and adapted to automatically engage the opposite draw-head, the draw-head being also provided with uncoupling mechanism acting with relation to the head of the coupling-hook of the opposite draw-head to elevate and disengage the same, and thus uncouple the cars.

The object of our invention is to provide a simple and improved car-coupling which will be absolutely automatic in operation, which will be equally efficient in its adaptation to both freight and passenger cars, which will entirely obviate the necessity for going between the cars either to "set" or operate the coupling, in which a single operation with relation to one draw-head will disengage the coupling-hooks of both adjoining draw-heads, and which will possess advantages in point of inexpensiveness, economy in manufacture, durability, ease of operation, and general efficiency.

We will now proceed to describe the preferred construction by which our invention is carried out, reference being had to the accompanying drawings, in which—

Figure 1 is a perspective view illustrating the application of our improved car-coupling to a freight-car. Fig. 2 is a side elevation of one of the draw-heads. Fig. 3 is a top or plan view of the same. Fig. 4 is a front view. Fig. 5 is a vertical longitudinal sectional view illustrating the operation. Fig. 6 is a corresponding view showing the automatic hook-coupling mechanism thrown back and the draw-head adapted for use in connection with the ordinary pin-and-link coupling. Fig. 7 is a horizontal longitudinal sectional view taken on the line $x\ x$, Fig. 5. Fig. 8 is a detail vertical transverse sectional view taken on the line $y\ y$, Fig. 5. Fig. 9 is a corresponding view on the line $z\ z$, Fig. 5. Fig. 10 is a detail perspective view of one of the coupling-hooks. Fig. 11 is a corresponding view of the uncoupling-lever within the draw-head. Fig. 12 is a vertical longitudinal sectional view illustrating the arrangement of uncoupling mechanism for passenger-cars. Fig. 13 is a front elevation, partly in section, showing another form of uncoupling mechanism adapted for passenger-cars. Fig. 14 is a longitudinal sectional view illustrating the same mechanism.

The same letters of reference indicate corresponding parts in all the figures.

Referring to the drawings, A designates the draw-head, which comprises the sides $a\ a$, the top $a'$, and the bottom $a^2$. At its front the draw-head is enlarged to form a chamber B for the accommodation of the coupling-hooks. The interior side walls $b\ b$ of this chamber preferably diverge forwardly, while the top $b'$ may be inclined upwardly and forwardly. The bottom $b^2$ of the chamber is preferably curved downwardly and forwardly, as shown, so that it will conveniently accommodate the lever for lifting the coupling-hook, as well as the head of the latter. At the lower portion of the mouth of the draw-head is provided an upwardly and rearwardly inclined wall or surface C to facilitate the automatic engagement of the coupling-hook, which has a cylindrical top edge $c$. This edge $c$ is preferably formed by a transverse steel rod or bar located during the process of casting the draw-head, and thus forming an integral part thereof. (See Fig. 5 of the drawings.)

B designates a transverse bar upon which the coupling-hook and uncoupling-lever are mounted. The ends $d\ d$ of this bar project through longitudinally-disposed slots E E in the respective sides of the draw-head, and carry washers F F, as shown, these washers, as well as the bar itself, being preferably retained in position by split pins or keys $f$, passing through eyes or perforations in the end of the bar. The bar D normally rests in recesses or depressions $e$, with which the slots E E terminate at their front ends, and while the bar rests in these recesses, which is its normal position, it is securely locked against movement in either a forward or rearward direction during the ordinary automatic operation of the coupling.

The coupling-hook G is formed by a rod or bar, which is by preference approximately rectangular in cross-section, and is pivotally mounted near its rear end upon the bar D, as shown at $g$. The coupling-hook normally rests upon the curved edge $c$ and projects from the mouth of the draw-head, its front edge being curved downwardly and rearwardly, as shown at $g'$, to facilitate automatic engagement, by which construction the nose of the hook is formed. Just in rear of the latter and at the lower terminal of the edge $g'$ is formed a curved recess $g^2$, which receives the corresponding edge $c$ of the adjoining draw-head. The rear end $g^3$ of the coupling-hook projects beyond the fulcrum, and is preferably reduced, as shown. The coupling-hook is mounted at one side the draw-head, while at the other side is arranged the lever H for lifting the coupling-hook of the adjoining draw-head. This lever comprises a cylindrical bearing portion $h$, mounted upon the bar D, and preferably occupying the entire space between the coupling-hook and the opposite side of the draw-head. From the portion $h$ projects a forwardly and downwardly curved portion $h'$, which normally rests at the bottom of the chamber B, and is widened, as shown, so that it will engage and lift the hook of the adjoining draw-head, in whatever position the hook may be with relation to the edge $c$. When the cars are coupled, this weight end $h'$ of the lever rests under the nose or head of the coupling-hook of the adjoining draw-head and is adapted to lift the same from engagement with the edge $c$ and will pass or "clear" the edge during this operation. The power end $h^2$ is preferably turned upwardly and rearwardly from the fulcrum $h$, and is thus located on a plane slightly above that of the end $g^3$ of the coupling-hook, the effect of this construction being that in uncoupling the lever is operated to slightly lift the hook of the adjoining draw-head before the coupling-hook of its own draw-head is disengaged, it being evident that this operation of disengaging both hooks and effecting a complete uncoupling is simultaneously accomplished by operating either one of the draw-heads and causing the uncoupling mechanism to bear upon the rear ends of the coupling-hook and lifting-lever.

The uncoupling is effected by means of a shoe or plate I, preferably circular in form, which is located above the rear ends of the coupling-hook and lifting-lever and carried by a vertical rod J, projecting upwardly through a longitudinal slot $j$ in the top of the draw-head. In the bottom of the draw-head is preferably provided a corresponding longitudinally-disposed slot $j'$, and these slots $j j'$ and E E all terminate in rear of the chamber B. Connection between the rod J and shoe I is preferably formed by means of a screw-threaded end $j^2$, entering a correspondingly-threaded eye or recess $i$ in the shoe. This rod J (in the case of freight-cars) projects through suitable bearings $j^3 j^3$ to the top of the car, and pivotally connected with it at suitable points are horizontally-disposed levers J' J', fulcrumed upon the end of the car and projecting to the sides of the same. (See Fig. 1.) The passage of the rod J through the longitudinally-disposed slot $j$ enables any desired longitudinal play of the draw-head, while the shoe has free action in a vertical plane, though it is stationary with relation to the transverse or longitudinal plane of the draw-head.

To enable coupling with draw-heads of the ordinary pin-and-link or similar constructions, perforations $k k'$ are respectively formed in the top and bottom walls of the chamber B, in rear of the front wall C and edge $c$, and are adapted to receive an ordinary coupling-pin. In rear of the top perforation $k$ is preferably provided on top of the draw-head a shoulder or enlargement K, which is adapted to act with relation to the beams at the end of the car, and thus limit the rearward movement of the draw-head, the employment of this construction being especially desirable in cases where bumpers are not provided upon the cars.

When coupling is made with the ordinary pin-and-link construction, the coupling-hook and lifting-lever are thrown back into the rear chamber B' of the draw-head, as shown in Fig. 6, to permit free entrance and working of the link in the chamber B. This adjustment is accomplished by simply depressing the outer end of the coupling-hook until the bar D is lifted from engagement with the recesses or depressions $e e$, when the whole mechanism (including the bar D, the coupling-hook, and the lifting-lever) is pushed back to the limit of the slots E E, and the ends of the bar D are received by recesses or depressions $e' e'$ at the rear terminals of said slots. By means of these recesses or depressions $e' e'$ the automatic coupling mechanism is securely retained in the position to which it has been adjusted during the employment of the ordinary pin-and-link mechanism, and while in this position the lifting-lever is located entirely within the chamber B', and only the front end of the coupling-hook remains within the chamber B, the head of the coupling-hook then resting against the edge $c$ and located at one side the chamber B, out of interference with the link. The uncoupling shoe or plate of course remains in its usual position and does not interfere with this adjustment of the other mechanism. To return the automatic coupling mechanism to its normal position, it is only necessary to raise the forward end of the coupling-hook and pull the mechanism forward until the bar D engages and rests in the recesses $e\ e$ at the front terminals of the slots E E, the disengagement of the bar D from the rear recesses $e'\ e'$ being readily accomplished. Thus, by reason of the retaining-recesses at the termini of the slots E E, the adjustment of the automatic coupling mechanism, for the purpose above set forth, is readily accomplished without the employment of cams or other locking mechanism at the sides of the draw-head, and without occasion for operating any other mechanism other than the projecting end of the coupling-hook at the front of the draw-head.

It will be understood that our improved draw-head is adapted for application of connection to the cars in any suitable or desired manner, the usual method being to pass the securing-bolt L, carrying the spring $l$, through a corresponding perforation $m$ in the rear wall M at the bottom of the draw-head, the inner end of the bolt being secured by a wedge or key $l'$, adapted to be reached for adjustment or removal through longitudinally-disposed slots $n\ n'$, forming a continuation of the slots J J′, and respectively located in the top and bottom of the draw-head.

The operation and advantages of our invention will be readily understood by those skilled in the art to which it appertains. When the draw-heads come together, the projecting coupling-hooks are on relatively opposite sides of the adjoining draw-heads, and they automatically, without any previous setting, adjustment, or operation, slide up the inclined front wall C of the mouth of the opposite draw-head and drop over the cylindrical edge $c$. To uncouple, it is simply necessary to depress the shoe or plate I of either draw-head by means of its operating mechanism, when it will bear first upon the lifting-lever and cause it to slightly elevate the head of the coupling-hook of the adjoining draw-head, when the shoe will also bear upon the rear end of the coupling-hook of its own draw-head, and then simultaneously (by its downward movement) raise the projecting end of the coupling-hook of its own draw-head and cause the lifting-lever to completely disengage the head of the coupling-hook of the adjoining draw-head from the edge $c$, thus by the one movement effecting the complete uncoupling of the draw-heads.

It will be noted that our improved coupling permits full lateral and vertical play of the cars to whatever extent is necessary and desirable, even more so than the car-couplings now generally in use, while the construction and arrangement, particularly that of the chamber B, afford ample and increased room and facility for the reception and operation of the different parts.

In the adaptation of our car-coupling to passenger-cars a different mechanism for operating the uncoupling-shoe I is employed. This mechanism, as shown in Fig. 12, preferably consists of a short vertical rod O, projecting up through an eye or perforation at the outer edge of the platform P of the car, and having an operating knob or handle $o$, normally received by a recess or depression $p$ in the platform, by which arrangement any obstruction upon the platform is obviated. The lower end of the rod O is pivotally connected with the front end of a longitudinally-disposed rocking lever Q, fulcrumed upon a standard R, projecting downwardly from the under side of the platform. The rear end of this lever is pivotally connected with a rod S, which corresponds to the rod J of the freight-car-uncoupling mechanism and passes through the slot $j$ and carries the shoe or plate. It will readily be seen that by lifting the rod O the depression of the shoe or plate will be readily accomplished through the medium of the connecting-lever.

In Figs. 13 and 14 we have shown another form of mechanism adapted for uncoupling passenger-cars, in which the rod O is located at the edge of the platform at one side the plane of the draw-head, and the lever Q consequently projects at right angles to the draw-head. In this construction the lever Q is carried under the draw-head at the rear end thereof and is pivotally connected with a rod S′, projecting upwardly through the slot $n'$ into the draw-head. This rod then extends forwardly and horizontally above the plane of the bar D, as shown at $s'$, and has its forward end turned upwardly and secured to the plate or shoe I from the under side, as shown at $s^2$. The rod S′ is located at the rear of the draw-head and extended forwardly above the plane of the bar D in this construction, so that it will not interfere with the rearward adjustment of the coupling mechanism, as shown in Fig. 6, and it will be noted that in this adjustment, with the present mechanism, the front end $s^2$ will be readily accommodated in the space between the rearwardly-projecting ends of the coupling-hook and lifting-lever H. In the operation of this mechanism the uncoupling shoe or plate I is drawn downwardly by the rod S′ as the rod O is lifted by the operator.

We do not limit ourselves to the exact construction, arrangement, and operation herein shown and described, as our invention is manifestly subject to various changes or modifications in construction and arrangement. We therefore wish to be understood as reserving the right to all such modifications in the construction, arrangement, and operation as properly fall within the spirit and scope of our invention and claims.

What we claim as our invention, and desire to secure by Letters Patent of the United States, is—

1. The combination, in a car-coupling, with the draw-head, of a transverse bearing-bar located therein, a coupling-hook pivotally mounted upon said bar and projecting from the draw-head, and a hook-lifting lever pivotally mounted upon the said coupling-hook bearing-bar at one side the coupling-hook of the draw-head and projecting downwardly and forwardly, and mechanism bearing upon the ends or portions of said hook and lever projecting in rear of their common bearing-bar for elevating the forward ends of the coupling-hook and lifting-lever, substantially as and for the purpose set forth.

2. The combination, in a car-coupling, of the draw-head having a chamber, as at B, at its front end, provided with an inclined wall at the lower portion of the mouth of said chamber, a transverse bearing-bar located within the draw-head, the coupling-hook pivotally mounted upon said bar and having its forwardly-projecting end normally resting upon said wall, said hook projecting in rear of its fulcrum, a hook-lifting lever mounted upon said coupling-hook bearing-bar at one side the coupling-hook and projecting downwardly and forwardly and in rear of its fulcrum, and an independent vertically-moving shoe or plate located within the draw-head and bearing upon the ends of the coupling-hook and hook-lifting lever which project in rear of their common fulcrum, substantially as and for the purpose set forth.

3. The combination, in a car-coupling, with the draw-head comprising the chamber at its front, as at B, having an inclined front wall at the lower end of the mouth of said chamber, having longitudinally-disposed slots in its sides and the longitudinally-disposed top slot, of a transverse bar mounted in said side slots and adjustable therein, a coupling-hook fulcrumed upon said adjustable bar and normally resting upon the inclined wall, a hook-lifting lever fulcrumed upon the bar at one side the coupling-hook and projecting downwardly and forwardly in rear of the inclined wall, a vertically-moving shoe or plate located within the draw-head and bearing upon the rear ends of the coupling-hook and hook-lifting lever, and an operating-rod secured to said plate and projecting through the top slot, substantially as and for the purpose set forth.

4. An improved car-coupling comprising the draw-head provided with a chamber, as at B, at its front end, having an inclined wall at the lower portion of the mouth of said chamber, provided with longitudinally-disposed slots in its sides having recesses or depressions at their termini, a transverse bar mounted in said slots and received by the recesses at the termini of the same, a coupling-hook fulcrumed upon the bar and normally resting upon the inclined wall, a hook-lifting lever fulcrumed upon the bar at one side the coupling-hook and projecting downwardly and forwardly in rear of the inclined wall, a vertically-moving shoe or plate bearing upon the rear ends of the coupling-hook and hook-lifting lever, and mechanism for operating this plate, substantially as and for the purpose set forth.

5. An improved car-coupling comprising the draw-head having the chamber at its front end, the rearwardly-inclined front wall at the lower portion of the mouth of said chamber, terminating in a cylindrical top edge, as at c, the vertical perforations adapted to receive an ordinary coupling-pin, the longitudinally-disposed slots in its sides having recesses or depressions at their termini, and a longitudinally-disposed top slot, a transverse bar mounted in the side slots and retained by said recesses, said bar being longitudinally adjustable, for the purpose set forth, a coupling-hook fulcrumed upon said bar and normally resting upon the inclined wall, a hook-lifting lever fulcrumed upon the bar at one side the coupling-hook and projecting downwardly and forwardly in rear of the inclined wall, a vertically-moving shoe or plate located within the draw-head above the rear ends of the coupling-hook and hook-lifting lever and adapted to bear upon the same, and an operating-rod secured to said plate and projecting upwardly through the top slot, substantially as and for the purpose set forth.

6. In a car-coupling, the combination, with the draw-head, of a longitudinally-adjustable hook-lifting lever fulcrumed within the same and projecting downwardly and forwardly, and independent mechanism disconnected therefrom and adapted for elevating the front portion of said lever, whereby it will lift and disengage the head of the coupling-hook of an adjoining draw-head, substantially as set forth.

7. In a car-coupling, the combination, with the draw-head provided with a chamber at its front portion and having an inclined front wall at the lower portion of the mouth of said chamber, said wall being adapted to be engaged by the coupling-hook of an adjoining draw-head and form the draft-bar of the coupling, of a hook-lifting lever fulcrumed at the rear of said chamber and projecting downwardly and forwardly in rear of and approximately under the inclined wall, and independent mechanism for elevating the front portion of the hook to cause the same to disengage the head of the coupling-hook of an adjoining draw-head from the top edge of the wall, substantially as shown and specified.

8. The combination, in a car-coupling, with the draw-head provided at its front end with a chamber and having a rearwardly-inclined front wall extending transversely across the lower portion of the mouth of said chamber, of a hook-lifting lever fulcrumed within the draw-head and projecting downwardly and forwardly in rear of and approximately under said wall, the operating portion or foot of the lever being broadened, substantially as set forth, with relation to the width of the wall, whereby it will operate to disengage the head of the coupling-hook of the adjoining draw-head in whatever relation said hook may be with relation to the transverse length of said wall, substantially as set forth.

9. In a car-coupling, the herein-described hook-lifting lever, comprising the cylindrical bearing portion, the rearwardly-projecting power end, and the downwardly and forwardly projecting operating portion formed with a broadened approximately flat foot, substantially as shown, and for the purpose set forth.

10. In a car-coupling of the class described, the combination, with the draw-head having an inclined front wall adapted to be engaged by the coupling-hook of an adjoining draw-head, of a hook-lifting lever fulcrumed in rear of said wall and having a front operating portion projecting downwardly and forwardly with relation thereto and formed with an approximately-flat broadened foot and with an arm projecting rearwardly and upwardly from its fulcrum, and a vertically-moving independent shoe or plate located above and adapted to bear upon said arm, substantially as and for the purpose set forth.

11. An improved draw-head comprising integrally an inclined front wall forming the front of the chamber and integral with the side walls thereof, and the herein-described steel bar projecting transversely through the draw-head and secured to the said sides and top edge of the front wall, said steel bar being thus a component part of the sides and wall of the integral draw-head and projecting above in rear of and below the limit of the wall proper and forming a steel wearing-edge for the same, substantially as set forth.

12. In a car-coupling of cast-iron or other metal, a steel bar or bolt secured in position with relation to the draw-head during the process of casting the same, and thus forming an integral component part thereof, said bolt being adapted to form the bearing-edge over which automatic coupling devices engage, substantially as and for the purpose set forth.

13. In a car-coupling, a pivoted coupling-hook located at one side, and a hook-lifting lever located at the side of the coupling-hook within the same draw-head and adapted to disengage the coupling-hook of an adjoining draw-head, substantially as set forth.

14. In a car-coupling, the combination of a coupling-hook and a hook-lifting lever mounted side by side upon the same transverse bar, and independent mechanism located over or above and acting directly upon the rear projecting portion of both, acting upon the coupling-hook and hook-lifting lever for simultaneously elevating the front ends of the same, substantially as and for the purpose set forth.

15. In a car-coupling comprising the draw-head having a chamber at its forward end provided with a transverse inclined front wall at the lower portion of its mouth, the combination of a coupling-hook fulcrumed within the draw-head and having its front portion normally resting upon said inclined wall, a hook-lifting lever fulcrumed at one side the coupling-hook and upon the same bearing bar or shaft and having a downwardly and forwardly projecting front portion, and a rear arm projecting above and at the side of the corresponding rear end of the coupling-hook, and a vertically-moving shoe or plate located above the rear ends of the hook-lifting lever and coupling-hook and adapted to first bear upon the former to elevate its front end with relation to the inclined wall, and then in its further movement simultaneously act directly upon and depress the rear ends of both the coupling-hook and hook-lifting lever, substantially as and for the purpose set forth.

16. In a car-coupling of the class described, the combination, with the transverse fulcrum-bar, of a coupling-hook pivotally mounted upon the same at one side the draw-head, and a hook-lifting lever fulcrumed upon the same fulcrum-bar and at one side the coupling-hook, and having the enlarged or elongated bearing portion occupying the entire space between the coupling-hook and the opposite side of the draw-head, whereby the coupling-hook is retained in position at one side, substantially as set forth.

17. In a car-coupling of the class described, having the draw-head provided with a chamber at its front end and with a transverse inclined front wall at the lower portion of the mouth of said chamber, said wall being adapted to be engaged by the coupling-hook of an adjoining draw-head, the combination of the transverse fulcrum-bar, a coupling-hook pivotally mounted upon the same at one side the draw-head and normally resting upon the inclined wall, and a hook-lifting lever fulcrumed upon the same fulcrum-bar and having a laterally-enlarged bearing portion extending from the side of the coupling-hook to the opposite side of the draw-head, whereby the coupling-hook is retained in position at one side of the chamber, said lever being provided with a front operating portion or foot projecting downwardly and forwardly, and broadened, so as to operate with relation to all that portion of the edge of the inclined wall not occupied by the coupling-hook, and also occupy the space within the chamber between the coupling-hook and the opposite side of the draw-head, substantially as and for the purpose set forth.

18. The combination, with the draw-head having the longitudinally-disposed slots in its sides provided with recesses or depressions at their termini, of the transverse fulcrum-bar carrying the coupling mechanism, which normally projects from the mouth of the draw-head, and comprises, essentially, a coupling-hook and hook-lifting lever having projecting rear arms or ends, both fulcrumed upon said bar and longitudinally adjustable therewith, and vertically-moving independently-operating mechanism adapted to bear upon said ends, but stationary with relation to the longitudinal adjustment of the hook and lever, the ends of the bar being received by the recesses at either end of the slots and retained in position thereby against accidental displacement, substantially as and for the purpose set forth.

19. In a car-coupling, the combination, with the draw-head having a chamber, as at B, at its front end, an inclined front wall at the lower portion of the mouth of said chamber, the vertical perforations adapted to receive an ordinary coupling-pin, and the longitudinally-disposed slots in its sides having the recesses or depressions at their termini, of the transverse fulcrum-bar carrying automatic coupling mechanism longitudinally adjustable with the fulcrum-bar, and comprising a coupling-hook having a rear arm or end and normally projecting from the mouth of the draw-head and resting upon the inclined wall, and vertically-moving independently-operating mechanism adapted to bear upon the rear arm of the coupling-hook and stationary with relation to the longitudinal adjustment thereof, the fulcrum-bar being normally seated in the recesses at the front ends of the slots and retained therein against dislodgment by rearward pressure, the bar being adapted to be lifted from said recesses by depression of the outer end of the coupling-hook and forced rearwardly to the rear recesses, substantially as and for the purpose set forth.

20. A car-coupling in which the draw-head is provided with a chamber at its front portion, in which the automatic coupling mechanism, comprising a coupling-hook and hook-lifting lever at the side of the same, is normally contained, this coupling mechanism being all mounted upon a longitudinally-adjustable transverse fulcrum bar adapted by its rearward adjustment to carry all the automatic coupling mechanism out of the chamber, so that only the front end of the coupling-hook remains at one side the same, whereby the employment of an ordinary pin-and-link coupling is permitted, the coupling-hook being entirely contained within the chamber by this adjustment, substantially as set forth.

21. A car-coupling in which the draw-head is provided with a chamber at its front portion, in which automatic coupling mechanism, comprising a coupling-hook and hook-lifting lever mounted side by side, is normally contained, in combination with an independent vertically-moving plate or shoe adapted to bear directly upon the rear ends of both the hook and lever, and stationary with relation to the longitudinal adjustment of said hook and lever, and a transverse fulcrum-bar carrying the hook and lever and longitudinally adjustable in the draw-head, said fulcrum-bar being adapted by its rearward adjustment to carry all the automatic coupling mechanism out of the chamber, under the operating-shoe, to the rear portion of the draw-head, and thus permit the employment of an ordinary pin-and-link coupling, substantially as set forth.

22. In a car-coupling, the combination, with the vertically-moving shoe or plate having the screw-threaded eye or recess, of the detachable operating-rod projecting through the top of the draw-head, and having the corresponding screw-threaded end, substantially as set forth.

23. In a car-coupling of the class described, embodying fulcrumed coupling hooks or levers, the combination of a vertically-moving plate or shoe adapted to bear upon the ends of the same, an operating-rod connected with said plate and projecting through the draw-head, a rod or handle located at the platform of the car or other suitable point, and a connecting-lever pivotally secured at its ends to said rods, substantially as and for the purpose set forth.

24. In a car-coupling, the combination of uncoupling mechanism, the car-platform provided with a recess or depression, and a vertically-adjustable operating-bar connected with the coupling mechanism and having its head normally contained within said recess, substantially as and for the purpose set forth.

25. The combination, with the draw-head carrying the automatic coupling mechanism carried by a longitudinally-adjustable fulcrum-bar and having the longitudinally-disposed slots in its under side, and with the plate or shoe adapted by its vertical movement to operate the coupling mechanism, of a rod or bar projecting upwardly through said slot at the rear end of the draw-head, extended forwardly above the plane of the fulcrum-bar and secured to the shoe or plate, and lever mechanism connected with the outer end of said rod and adapted to vertically operate the same, substantially as set forth.

26. The combination of a draw-head having longitudinally-disposed slots in its sides, a transverse fulcrum-bar mounted in said slots and longitudinally adjustable therein, a coupling-hook fulcrumed upon said bar at one side the draw-head and having an arm or end projecting in rear of its fulcrum, a hook-lifting lever fulcrumed upon the same bar beside the coupling-hook and having an arm or end projecting in rear of its fulcrum, and independent mechanism located above the rear ends of the hook and lever and acting directly and simultaneously upon the same, substantially as and for the purpose set forth.

27. The combination of a draw-head having longitudinally-disposed slots in its sides, a transverse fulcrum-bar mounted in said slots and longitudinally adjustable therein, a coupling-hook fulcrumed upon said bar at one side the draw-head and having an arm or end projecting in rear of its fulcrum, a hook-lifting lever mounted upon the same bar beside the coupling-hook and having an arm or end projecting in rear of its fulcrum, a vertically-moving independent shoe or plate located above the rear ends of the hook and lever and adapted to operate directly and simultaneously upon both said ends, and an operating-rod carrying said plate and stationary with relation to the longitudinal adjustment of the fulcrum-bar and automatic coupling mechanism, substantially as and for the purpose set forth.

28. The combination of a draw-head having a chamber at its front end provided with an inclined transverse wall adapted to be engaged by the coupling-hook of an adjoining draw-head, and provided with a vertical perforation extending through said chamber and adapted to receive an ordinary coupling-pin, and with longitudinally-disposed slots in its sides in rear of said chamber, a transverse fulcrum-bar mounted in said slots and longitudinally adjustable therein, a coupling-hook fulcrumed upon said bar and having an arm or end projecting in rear of its fulcrum, a hook-lifting lever fulcrumed upon the same bar beside the coupling-hook and having a front end acting with relation to the inclined wall and an arm or end projecting in rear of its fulcrum, both the hook and lever being longitudinally adjustable in the draw-head by movement of their joint fulcrum-bar, an independent vertically-moving shoe or plate located above the rear ends of the hook and lever and adapted to directly and simultaneously act upon both said ends when the automatic coupling mechanism is in normal position, and an operating-bar carrying said plate and stationary with relation to the longitudinal adjustment of the automatic coupling mechanism, substantially as and for the purpose set forth.

In testimony whereof we affix our signatures in presence of two witnesses.

JEROME B. MOTTER.
ERASTUS B. TODD.

Witnesses:
C. M. CALVERT,
N. P. CONAWAY.